Feb. 24, 1970  W. B. DUFFY  3,496,613
QUARTER-TURN FASTENER
Filed May 22, 1968

INVENTOR.
WILLIAM B. DUFFY
BY Charles F. Chisholm
ATTORNEY

United States Patent Office 3,496,613
Patented Feb. 24, 1970

3,496,613
QUARTER-TURN FASTENER
William B. Duffy, Berkeley Heights, N.J., assignor to United-Carr Incorporated, Boston, Mass., a corporation of Massachusetts
Filed May 22, 1968, Ser. No. 731,130
Int. Cl. F16b 19/00
U.S. Cl. 24—221         10 Claims

ABSTRACT OF THE DISCLOSURE

A rotary fastener of the type which is sometimes designated a quarter-turn fastener and is so designated herein. At its forward end the fastener has a transverse barlike nose which may be inserted through a suitable opening in a layerlike member and thence through a suitable opening in a support, the fastener then being rotated on its axis a quarter-turn more or less to secure the member to the support. The barlike nose of the fastener, which is composed of two layers of sheet metal, is provided with a sheet-metal fitting that facilitates application of the fastener to the support. This fitting may be utilized to hold the fastener captive to a layerlike member before the fastener is applied to the support.

BACKGROUND OF THE INVENTION

In applying the fastener of the present invention it is ordinarily rotated on its axis for approximately ¼ of a turn. Therefore it is designated herein as a quarter-turn fastener without regard to whether, in particular instances, it may be turned considerably more or considerably less than ¼ of a turn.

Many quarter-turn fasteners are known and are used for many specific purposes. The fastener may have an ornament or other element attached to it and serve to attach the ornament or element to a panel or other support. Perhaps more commonly the fastener is used to secure two or more layerlike members together, e.g. to fasten a cover or the like to a panel or other support. In some instances more than one layer may be secured to the support, e.g. where a gasket intervenes between the cover and the support.

The present fastener is an improvement upon the fastener of U.S. Patent 3,121,273 issued Feb. 18, 1964. While the fastener of that patent has been extensively used, it can be troublesome unless carefully pressed forward when applying it to a support. In applying that fastener the transverse barlike nose is inserted through a suitable opening in the support and then the fastener is rotated on its axis to bring the nose into overlapping relationship with the rear face of the support. The barlike nose is composed of sheet metal folded into two face-to-face layers connected by a bight at the tip of the fastener nose. These sheet-metal layers have rearwardly-facing edges which, in the applied fastener, confront the rear face of the support.

The fastener of U.S. Patent 3,121,273 includes spring means which is manually overpowered when the fastener is pressed forward to pass the nose of the fastener completely through the hole in the support, preparatory to rotating the fastener a quarter turn. If the installer fails to apply and maintain sufficient pressure to project the nose completely through the support and keep the nose free of the rear face of the support while rotating the fastener a quarter turn, there is likely to be difficulty. If the fastener nose doesn't completely clear the support before the turning movement is started, the nose strikes the edge of the hole in the support and the turning movement of the fastener is blocked. Even if the turning movement be properly started, there can be difficulty if the pressure on the fastener isn't maintained sufficiently to keep the nose clear of the rear face of the support while making the quarter turn. Under such circumstance the rearwardly-facing sheet-metal edges of the nose will drag on the rear face of the support and interfere with the turning movement, particularly if the rear face of the support is rough or if the support is of fibrous material.

SUMMARY OF THE INVENTION

The present invention overcomes the foregoing difficulties by means of a sheet-metal fitting which is attached to the barlike nose of the quarter-turn fastener of U.S. Patent 3,121,273.

In accordance with a feature of the invention the fitting has ramp portions which are available to engage the edge of the hole in a support at the beginning of the rotation of the fastener to thereby facilitate the start of the turning movement. In accordance with another feature the fitting has smooth portions which overlie the rearwardly-facing edges of the sheet-metal layers of the fastener nose, thereby providing smooth bearing-surfaces to slide over the rear face of the support as the fastener is rotated.

In accordance with another feature of the invention the smooth portions which overlie the rearwardly-facing edges of the layers of the fastener-nose are portions of sheet-metal fingers which secure the fitting to the barlike nose of the fastener.

In accordance with further features of the invention the sheet-metal fitting has a troughlike body which is nested over the barlike nose of the fastener and the ramp portions of the fitting extend from the edges of the trough formation to the smooth portions that overlie the rearwardly-facing edges of the layers of the fastener nose.

In accordance with still further features of the invention the troughlike body of the fitting is nested against the tip of the fastener nose and the fitting is provided with two pairs of sheet-metal fingers equidistant from the fastener axis on opposite sides thereof, these fingers extending from the edges of the trough formation to the rearwardly-facing edges of the layers of the fastener-nose and thence toward one another to secure the fitting to the fastener-nose.

In accordance with additional features of the invention the troughlike body of the fitting is substantially as long as the barlike nose of the fastener and the pairs of fingers are adjacent to the ends of the barlike nose.

In accordance with other features of the invention the depth of the trough formation of the fitting is substantially less than the distance between the tip of the fastener nose and the rearwardly-facing edges of the layers of the fastener-nose, and the fingers of each pair converge from the edges of the trough formation to the rearwardlly-facing edges of the layers of the fastener-nose.

In accordance with further features of the invention the free ends of the fingers of each pair closely approach each other but have a small space between them so that the trough formation of the fitting can collapse somewhat to pass through a tight hole in a layerlike member, the trough formation being sufficiently resilient to then spring back and hold the fastener captive to the member.

While the presently preferred embodiment of the invention has all of the foregoing feature, among others, it is left to the user to decide upon the omission of any feature or features which are not needed for his particular use.

BRIEF DESCRIPTION OF THE DRAWING

In the drawing the thickness of sheet metal is necessarily exaggerated.

FIG. 1 is a side elevational, the axis of the fastener being horizontal.

FIG. 2 is a section taken generally on the line 2—2 of FIG. 1.

FIG. 3 is a view from the left of FIG. 1. This makes the view a rear elevation, i.e. an elevation from the rear of the fastener as it is advanced in passing the nose of the fastener through a hole in a support.

FIG. 4 is a view from the right of FIG. 1. This makes the view a front elevation, i.e. an elevation from the front of the fastener as it is advanced in passing the nose of the fastener through a hole in a support.

FIG. 5 is an end elevation of the sheet-metal fitting for the nose of the fastener, as the fitting is formed before being attached to the nose of the fastener.

FIG. 6 is a view of the fitting shown in FIG. 5, looking from the top of FIG. 5.

FIG. 7 is a view of the fitting shown in FIGS. 5 and 6, looking from the left of FIG. 6.

FIG. 8 is a view of the fitting shown in FIGS. 5–7, looking from the right of FIG. 6.

FIG. 9 is a diagram showing the sheet metal that is taken from a flat sheet and formed into the fitting of FIGS. 5–8. The sheet metal diagrammed in FIG. 9 is often called the "blank," even though portions of the diagrammed sheet metal be struck from the sheet successively and be formed as they are struck.

DESCRIPTION OF THE EMBODIMENT THAT IS PRESENTLY PREFERRED

Figure 1:
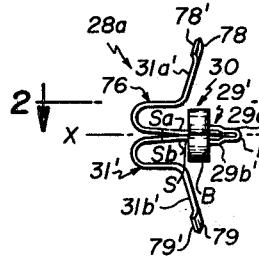
FIGS. 1–4 show the fastener without the fitting that is attached to the nose of the fastener.

Except as may be otherwise indicated the description under this heading refers only to the particular form of the invention that is shown in the drawing. The drawing shows the presently preferred embodiment, i.e. the best mode thus far contemplated of carrying out the invention.

The fastener, which is designated as a whole by F, is shown in FIGS. 10–13. It is composed of the sheet-metal piece 28a that is shown in FIGS. 1–4 and the sheet-metal piece 40 that is shown in FIGS. 5–8. The piece 40 is a one-piece sheet-metal fitting that is attached to the one-piece sheet-metal structure 28a. Thus the structure 28a is the fastener without the fitting 40. However, the structure 28a isn't the fastener of the present invention, and for convenience the structure 28a will be referred to as the fastener frame.

Figure 12:
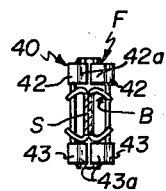
FIG. 12 is a view of the forward portion of the fastener shown in FIGS. 10 and 11, the view being taken on the line 12—12 of FIG. 11.
Figure 13:
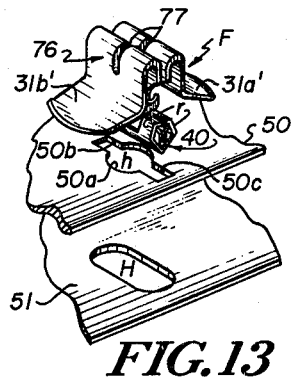
FIG. 13 is an exploded perspective view showing the fastener of FIGS. 10–12 associated with fastener-receiving portions of two layerlike members that are to be fastened together by the fastener. In this view the axis of the fastener is substantially vertical.

The fastener has an axis X—X on which the fastener is rotated a quarter turn in applying it to a panel or other support. In use the axis of the fastener may be horizontal, vertical, or in any inclined position. FIGS. 1–8 and 10–12 are on the basis of the fastener axis being horizontal. FIG. 13 is on the basis of the fastener axis being vertical or nearly so.

Figure 2:
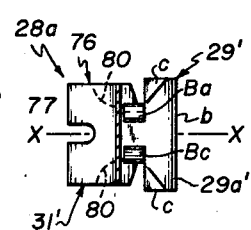

The fastener frame 28a is formed from a strip of sheet metal that is folded at its transverse center line into a bight at b. Proceeding from the bight the fastener frame has a nose 29′, a body 30, and a head 31′. As is seen in FIG. 1, the nose 29′ is composed of two sheet-metal layers 29a′ and 29b′ which are in face-to-face relationship. Throughout most of their length crosswise of the axis X—X (see FIG. 2) the two layers 29a′ and 29b′ closely approach each other and may be in contact. Adjacent to the corners c, c the layers 29a′ and 29b′ are flared apart, giving the ends of the nose a somewhat V-like configuration as is seen in FIG. 1. As is seen in FIGS. 2 and 4, the nose 29′ is bar-like and extends transversely of the fastener axis X—X.

The body 30 of the fastener frame 28a is composed of a shank S that is embraced by a barrellike formation B that will be called the barrel. The shank S is composed of two sheet-metal layers Sa and Sb which extend homogeneously from the nose layers 29a′ and 29b′, respectively. The layers Sa and Sb closely approach each other and may be in contact. The barrel B is formed by curved ears Ba, Bb, Bc, and Bd (FIG. 4) that extend homogeneously from the edges of the shank layers.

The head 31′ is considerably wider than the shank S, which is composed of the shank layers Sa and Sb. Radii such as 80, 80 (FIG. 2) connect the edges of the head 31′ with the edges of the narrower shank layers. In the head 31′ the sheet metal extending from the shank layers Sa and Sb is continued in the direction of the fastener axis and is then recurved toward the nose 29′ before being extended outwardly into wings 31a′ and 31b′. This provides the head 31′ with a protuberance that is designated as a whole by 76. This protuberance can be grasped with the fingers, or with pliers, for inserting the fastener and then giving it a quarter-turn. The protuberance 76 is provided with a slot 77 to receive a screw driver for use in inserting the fastener and giving it a quarter-turn.

Figures 3, 4:
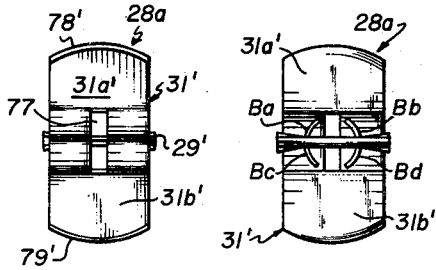

The tips of wings 31a′ and 31b′ are arcuate as the head 31′ is viewed in FIG. 3. Additionally, the end zones 78′ and 79′ of the wings 31a′ and 31b′ are curved toward the viewer in FIG. 3 (toward the left in FIG. 1), providing smooth rounded bearing surfaces at 78 and 79 (FIG. 1) whereby the head 31′ glides smoothly over a painted surface on the head-adjacent layer of an assembly without marring the paint.

Figure 9:
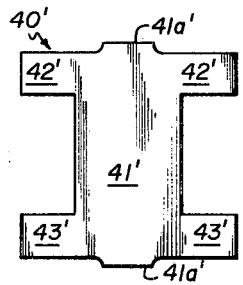

The sheet-metal blank 40′ of FIG. 9 is formed into the sheet-metal fitting 40 of FIGS. 5–8, these figures showing the fitting 40 as initially made for incorporation into the fastener F. The blank 40′ includes a body 41′ with stub ends 41a′, 41a′. The blank also includes two pairs of fingers 42′, 42′ and 43′, 43′. These pairs of fingers extend from the body 41′ adjacent to the ends thereof as shown.

The fitting 40 has a troughlike sheet-metal body 41 with stub ends 41a, 41a, the troughlike formation having been formed from the body 41′ of the blank with its stub ends 41a′, 41a′. Adjacent to one end of the troughlike body 41 there is a pair of fingers 42, 42 formed from the fingers 42′, 42′ of the blank. Adjacent to the other end of the troughlike body 41 there is a second pair of fingers 43, 43 formed from the fingers 43′, 43′ of the blank. One finger of each pair of fingers 42, 42 and 43, 43 extends homogeneously from the edge 41b of the trough formation, and the other finger of each pair extends homogeneously from the edge 41c of the trough formation.

Figure 5:
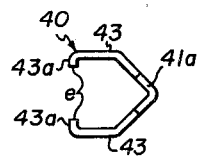
FIGS. 5–9 are to a considerably larger scale than FIGS. 1–4.
Figure 5A:
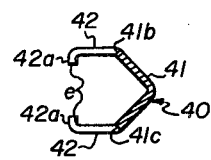
FIG. 5A is a section on the line 5A—5A of FIG. 6.
Figure 6:
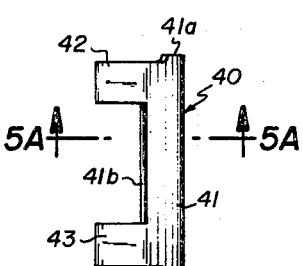
Figure 7:
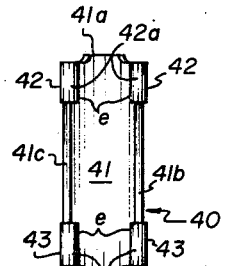
Figure 8:
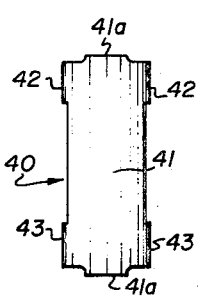

The fingers 42, 42 are bent to provide aligned end portions 42a, 42a which are inturned, i.e. they extend toward each other. Likewise the fingers 43, 43 are bent to provide aligned end portions 43a, 43a which are inturned. The free end of each of the four fingers 42, 42 and 43, 43 is designated by e. As is seen in FIGS. 5 and 5A, there is considerable separation between the ends e, e of the two fingers of each pair. This separation is reduced when the fitting 40 is attached to the fastener frame 28a of FIGS. 1–4, as will be explained.

The fitting 40 is assembled with the barlike nose 29′ of the fastener frame 28a by passing the two pairs of fingers 42, 42 and 43, 43 over the nose 29′ and nesting the bottom of the trough formation of the fitting 40 against the tip of the nose 29′, the opposite sides of the trough formation confronting the opposite faces of the nose 29′ and diverging therefrom. The depth of the trough formation of the fitting 40 is substantially less than the distance between the tip of the nose 29′ and the rearwardly-facing edges of the nose layers 29a′ and 29b′. The fingers 42, 42 and 43, 43, which extend from the edges of the trough formation, are long enough to place the inturned end portions 42a, 42a and 43a, 43a slightly beyond the rearwardly-facing edges of the nose layers 29a and 29b. The ends 41a, 41a of the fitting 40 are aligned with the ends of the nose 29′, which places the two pairs of fingers 42, 42 and 43, 43 equidistant from the fastener axis X—X on opposite sides thereof.

Figure 10:
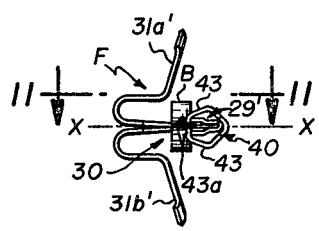
FIG. 10 is a side elevation, corresponding to FIG. 1, showing the fastener after the sheet-metal fitting of FIGS. 5–8 has been attached to the nose of the fastener.
Figure 11:
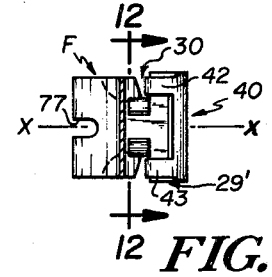
FIG. 11 is a section taken generally on the line 11—11 of FIG. 10.

The fitting 40 having been nested onto the nose 29′ as just explained, the fingers of each pair are bent toward each other thereby moving the inturned finger end-portions 42a, 42a and 43a, 43a into overlying relationship with the rearwardly-facing edges of the nose layers 29a′ and 29b′ and thus securing the fitting 40 to the nose 29′. After the finger end-portions 42a, 42a and 43a, 43a have been brought into overlying relationship with the rearwardly-facing edges of the nose layers 29a and 29b, these end portions are bent into substantial contact with the reardwardly-facing edges of the layers 29a′ and 29b′. In bending the fingers of each pair toward one another, the confronting ends e, e of each pair of fingers may be brought into contact but, upon release of the bending pressure, spring-back of the metal will cause the confronting ends to separate somewhat as is seen in FIGS. 10 and 12. The bending of the fingers to secure the fitting 40 to the nose 29′ is accompanied by some displacement of the sides of the trough formation of the fitting toward each other in zones that are adjacent to the roots of the fingers 42 42, and 43, 43.

The fastener frame 28a and the fitting 40 are each formed from annealed spring steel and the complete fastener F is hardened and tempered after the fitting 40 has been attached to the nose 29′. For the fastener frame 28a, sheet spring-steel .017″ thick is believed to be suitable. For the fitting 40 sheet spring-steel .015″ thick is believed to be suitable.

In use the fastener F is applied to a support, either to attach to the support an ornament or the like carried by the fastener head or to attach to the support a cover or the like through which the fastener is passed before being applied to the support. In FIG. 13 the fastener F is to be applied to the support 51, which is in the form of a panel. Before being applied to the support 51 the fastener is to be passed through a layerlike cover 50 for fastening the cover 50 to the support 51. Stated differently, the fastener F in FIG. 13 will be fastening together two layerlike members 50 and 51.

The total thickness of the layer or layers for which the fastener F is adapted depends upon the axial length of the fastener between the barlike fastener-nose (with its fitting 40) and a transverse plane at the roots of the wings 31a′ and 31b′. This axial length is made as great as the total thickness through which the fastener is to pass and even several thousandths of an inch more than such total thickness. Where the fastener is to fasten together two or more layers, the total thickness for which the fastener is adapted is divided between the layers.

In FIG. 13 the cover 50 has a through hole which is designated as a whole by h. This hole has a central circular-portion 50a from which slots 50b and 50c extend diametrically in opposite directions. The over-all length of the hole h, from the closed end of slot 50b to the closed end of slot 50c, is somewhat longer than the cross-axial length of the fastener nose 29′ with its fitting 40. Nevertheless the hole h is a tight hole for the fastener nose with its fitting 40, by reason of the width of the slots 50b and 50c being several thousandths of an inch less than the width of the fitting 40 adjacent to the roots of the pairs of fingers 42, 42 and 43, 43.

In the completed fastener F the ends of the pairs of fingers 42, 42 and 43, 43 (see ends e, e in FIGS. 5 and 5A) are spaced apart by several thousandths of an inch; and the fingers of each pair can be forced toward each other a little. The trough formation of the fitting 40 is resilient and can be collapsed slightly and then allowed to spring back. As the fastener is moved forward on its axis to pass the fastener nose with its fitting 40 through the hole h, the diverging sides of the trough formation of the fitting 40 engage the edges of the slots 50b and 50c and collapse the trough formation a little with consequent movement of the fingers of each pair toward each other, thereby permitting the fastener nose with its fitting 40 to pass through the tight hole h. Once the fastener nose with its fitting 40 is completely through the panel 50, the fitting 40 springs back and holds the fastener F captive to the cover 50.

The supporting panel 51 has a through hole which is designated as a whole by H, this hole being adapted to pass the nose of the fastener with its fitting 40 without binding. In some instances the hole H will have the same configuration as the hole h but be a little larger. However, the hole H may be a simple oval as shown in FIG. 13, the width of the oval being substantially less than the cross-axial length of the fastener nose with its fitting 40.

To attach the cover 50 to the supporting panel 51, the cover 50 with the fastener F captive thereto is moved toward the panel 51 with the hole h in the cover in registration with the hole H in the panel 51. By the hole h being in registration with the hole H it is simply meant that the two holes overlap sufficiently to permit the fastener nose with its fitting 40 to be passed through the hole H. With the cover 50 in face-to-face contact with supporting panel 51 and the tips of the wings 31a′ and 31b′ lightly against the front face of the cover 50, the fastener nose with its fitting 40 will only be started through the hole H. To project the fastener nose with its fitting 40 completely through the hole H before starting to rotate the fastener, it is necessary to apply firm forward pressure on the fastener head to cause the required yielding of the spring wings 31a′, 31b′. Normally, the fastener nose with its fitting 40 is first projected somewhat over halfway through the opening H and then the fastener is rotated on its X—X axis; the initial rotation causes camming action which pulls the nose of the fastener forward to permit the desired continued rotation, as will be explained. In substance, the wings 31a′ and 31b′ are spring means which exert retractive force on the shank and nose of the applied fastener, such spring means being overpowered to pass the fastener nose with its fitting 40 through the opening H.

The forward axial pressure that must be applied to the head of the fastener F to project the fastener nose with its fitting 40 completely through the hole H is considerable. Without the fitting 40, it would be necessary for the installer to be very careful to apply this considerable axial pressure and then to maintain it as he initiated the quarter turn of the fastener; otherwise the nose of the fastener would not quite clear the face of the support 51 and rotation of the fastener would be blocked by the fastener nose striking the edge of the hole H. With the fitting 40, the ramp portions r (two seen in FIG. 13) provided by the converging pairs of fingers 42, 42 and 43, 43 (see also FIGS. 10–12) are available as inclined planes to slidably engage the edge of the hole H and thereby pull the nose of the fastener forward to the extent needed for the desired continued rotation of the fastener. As the quarter turn of the fastener progresses, the inturned end portions 42a, 42a and 43a, 43a of the fingers (see FIGS. 10 and 12) which overlie the rearwardly-facing edges of the nose layers 29a′ and 29b′ (see FIGS. 1 and 2), provide smooth bearing surfaces to slide over the rear face of the support 51. It will be understood that the cover 50 will have a plurality of fasteners F distributed about its periphery for securing the cover at a plurality of points, only one of such fasteners F being shown in FIG. 13.

If the fastener F is to be applied directly to a support without being used for attaching another member to the support, the hole in the support will have the configuration of the hole $h$, but the slot portions of the hole will be wide enough to freely pass the nose and fitting 40 of the fastener. Also the axial length of the fastener between the nose-fitting 40 and the roots of the wings 31$a'$ and 31$b'$ will be co-ordinated with the thickness of the support. The central circular-portion of the hole in the support will receive the barrel B of the fastener and provide a suitable bearing surface for the quarter-turn of the fastener. In FIG. 13 the central circular-portion of the hole $h$ receives the fastener barrel B and provides a suitable bearing for the quarter-turn of the fastener.

When it is said that a fastener is being used to fasten together two layerlike members, this does not exclude the situation where one or more additional layerlike members are between the two layerlike members that are mentioned.

What I claim is:

1. A quarter-turn fastener having a shank extending lengthwise of the fastener axis and having a barlike nose that is perpendicular to the fastener axis at the forward end of the shank, the fastener being applied to a support by inserting the nose through a suitable opening in the support and rotating the fastener on its axis to position the nose in overlapping relationship with the rear face of the support, the fastener having spring means for exerting retractive force on the shank and nose of the applied fastener, such spring means being overpowered to pass the nose of the fastener through the opening in the support, and such spring means retracting the nose of the applied fastener against the rear face of the support, the barlike nose being sheet metal that is folded into two face-to-face sheet-metal layers connected by a bight at the tip of the fastener nose, the barlike nose extending in opposite directions from the fastener shank and the sheet-metal layers of the nose having rearwardly-facing edges which in the applied fastener confront the rear face of the support wherein the improvement comprises:
 a sheet-metal fitting attached to the barlike nose,
  the fitting having smooth portions which overlie the rearwardly-facing edges of the sheet-metal layers of the nose and provide smooth bearing-surfaces to slide over the rear face of the support as the fastener is rotated in applying it to the support.

2. A quarter-turn fastener as in claim 1 wherein the improvement further comprises:
 the sheet-metal fitting having ramp portions which lead to the smooth portions that overlie said rearwardly-facing edges,
  the ramp portions being available to engage the edge of the hole in the support at the beginning of the rotation of the fastener in applying it to the support and thereby facilitate the application of the fastener to the support.

3. A quarter-turn fastener as in claim 2 wherein the improvement further comprises:
 the sheet-metal fitting having a troughlike body which is nested over the barlike nose of the fastener,
 and the ramp portions of the fitting extending from the edges of the trough formation to the smooth portions that overlie said rearwardly-facing edges.

4. A quarter-turn fastener as in claim 1 wherein the improvement further comprises:
 the smooth portions that overlie said rearwardly-facing edges being portions of sheet-metal fingers which secure the fitting to the barlike nose of the fastener.

5. A quarter-turn fastener as in claim 1 wherein the improvement further comprises:
 the smooth portions that overlie said rearwardly-facing edges being portions of sheet-metal fingers which secure the fitting to the barlike nose,
 and the fitting having ramp portions which lead to the sheet-metal finger-portions,
  the ramp portions being available to engage the edge of the hole in the support at the beginning of the rotation of the fastener in applying it to the support and thereby facilitating the application of the fastener to the support.

6. A quarter-turn fastener having a shank extending lengthwise of the fastener axis and having a barlike nose that is perpendicular to the fastener axis at the forward end of the shank, the fastener being applied to a support by inserting the nose through a suitable opening in the support and rotating the fastener on its axis to position the nose in overlapping relationship with the rear face of the support, the fastener having spring means for exerting retractive force on the shank and nose of the applied fastener, such spring means being overpowered to pass the nose of the fastener through the opening in the support, and such spring means retracting the nose of the applied fastener against the rear face of the support, the barlike nose being sheet metal that is folded into two face-to-face sheet-metal layers connected by a bight at the tip of the fastener nose, the barlike nose extending in opposite directions from the fastener shank and the sheet-metal layers of the nose having rearwardly-facing edges which in the applied fastener confront the rear face of the support wherein the improvement comprises:
 a one-piece sheet-metal fitting having a troughlike body which overlies the barlike nose,
  the bottom of the trough formation being nested against the tip of the barlike nose,
  the opposite sides of the trough formation confronting the opposite faces of the barlike nose and diverging therefrom,
 and the fitting being provided with two pairs of sheet-metal fingers,
  the pairs of fingers being equidistant from the fastener axis on opposite sides thereof,
  one finger of each pair extending from one edge of the trough formation and the other finger of each pair extending from the other edge of the trough formation,
  and the fingers of each pair extending to the rearwardly-facing edges of the sheet-metal layers of the nose and thence toward one another closely adjacent to such edges whereby the fingers secure the fitting to the barlike nose of the fastener.

7. A quarter-turn fastener as in claim 6 wherein the improvement further comprises:
 the troughlike body of the sheet-metal fitting being substantially as long as the barlike nose,
 and the pairs of fingers being adjacent to the ends of the barlike nose.

8. A quarter-turn fastener as in claim 6 wherein the improvement further comprises:
 the troughlike body of the sheet-metal fitting being substantially as long as the barlike nose,
 the pairs of fingers being adjacent to the ends of the barlike nose,
 the depth of the trough formation being substantially less than the distance between the tip of the barlike nose and the rearwardly-facing edges of the sheet-metal layers of the nose,
 and the fingers of each pair converging from the edges of the trough formation to the rearwardly-facing edges of the sheet-metal layers of the nose.

9. A quarter-turn fastener as in claim 6 wherein the improvement further comprises:
 the free ends of the fingers of each pair closely approaching each other but having a small space between them, whereby the trough formation can collapse somewhat to pass through a tight hole in a layerlike member, and the trough formation being sufficiently resilient to then spring back and hold the fastener captive to such member.

10. A quarter-turn fastener as in claim 6 wherein the improvement further comprises:

the troughlike body of the sheet-metal fitting being substantially as long as the barlike nose, the pairs of fingers being adjacent to the ends of the barlike nose, the depth of the trough formation being substantially less than the distance between the tip of the barlike nose and the rearwardly-facing edges of the sheet-metal layers of the nose, the fingers of each pair converging from the edges of the trough formation to the rearwardly-facing edges of the sheet-metal layers of the nose, the free ends of the fingers of each pair closely approaching each other but having a small space between them, whereby the ttrough formation can collapse somewhat to pass through a tight hole in a layerlike member, and the trough formation being sufficiently resilient to then spring back and hold the fastener captive to such member.

References Cited

UNITED STATES PATENTS

| | | | |
|---|---|---|---|
| 1,570,281 | 1/1926 | Raymond | 24—221 |
| 2,032,315 | 2/1936 | Chaffee | 85—5 |
| 2,035,429 | 3/1936 | Hall | 24—221 X |
| 2,055,427 | 9/1936 | Churchill. | |
| 2,334,676 | 11/1943 | Jones | 24—221 |
| 2,584,813 | 2/1952 | Poupitch | 85—5 |
| 2,728,259 | 12/1955 | Poupitch | 85—5 |
| 3,121,273 | 2/1964 | Duffy et al. | 24—221 |

STEPHEN J. NOVOSAD, Primary Examiner

U.S. Cl. X.R.

85—5

UNITED STATES PATENT OFFICE
CERTIFICATE OF CORRECTION

Patent No. 3,496,613 February 24, 1970

William B. Duffy

It is certified that error appears in the above identified patent, and that said Letters Patent are hereby corrected as shown below:

In the heading to the printed specification, line 5, "Massachusetts" should read -- Delaware --. Column 9, line 21, "ttrough" should read -- trough --.

Signed and sealed this 1st day of December 1970.

(SEAL)
Attest:

Edward M. Fletcher, Jr.
Attesting Officer

WILLIAM E. SCHUYLER, JR.
Commissioner of Patents